US012090762B2

(12) United States Patent
Watanabe

(10) Patent No.: US 12,090,762 B2
(45) Date of Patent: Sep. 17, 2024

(54) INK-JET RECORDING APPARATUS

(71) Applicant: KYOCERA Document Solutions Inc., Osaka (JP)

(72) Inventor: Takeshi Watanabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 211 days.

(21) Appl. No.: 17/865,186

(22) Filed: Jul. 14, 2022

(65) Prior Publication Data

US 2023/0016876 A1 Jan. 19, 2023

(30) Foreign Application Priority Data

Jul. 16, 2021 (JP) ................................ 2021-117837

(51) Int. Cl.
*B41J 2/165* (2006.01)
*B41J 11/00* (2006.01)
*B41J 2/045* (2006.01)

(52) U.S. Cl.
CPC ......... *B41J 2/16526* (2013.01); *B41J 11/007* (2013.01); *B41J 2/04573* (2013.01); *B41J 2002/16573* (2013.01); *B41J 2002/16591* (2013.01)

(58) Field of Classification Search
CPC .. B41J 2/16526; B41J 11/007; B41J 2/04573; B41J 2002/16573; B41J 2002/16591
See application file for complete search history.

(56) References Cited

U.S. PATENT DOCUMENTS 11,667,120 B2 * 6/2023 Yoda et al. .......... B41J 2/16517
2006/0132572 A1 6/2006 Mochizuki et al. .......... 347/104

FOREIGN PATENT DOCUMENTS

JP 2006-159556 A 6/2006

* cited by examiner

*Primary Examiner* — Geoffrey S Mruk
(74) *Attorney, Agent, or Firm* — Stein IP LLC

(57) ABSTRACT

A control portion sets, as a control period, a period after arrival, at a position opposite a recording head, of a first recording medium until passage, at the position opposite the recording head, of a last recording medium. The control portion sets nozzles that do not face the recording medium during the control period as first nozzles, and nozzles that face the recording medium during the control period as second nozzles, to make the total amount of ink ejected by each of the first nozzles in flushing processing during the control period smaller than the total amount of ink ejected by each of the second nozzles.

6 Claims, 10 Drawing Sheets

NUMBER OF INK EJECTION LINES IN FLUSHING PROCESSING

NUMBER OF INK EJECTION LINES
IN FLUSHING PROCESSING

INK-JET RECORDING APPARATUS

INCORPORATION BY REFERENCE

This application is based upon and claims the benefit of priority from the corresponding Japanese Patent Application No. 2021-117837 filed on Jul. 16, 2021, the entire contents of which are hereby incorporated by reference.

BACKGROUND

The present disclosure relates to an ink-jet recording apparatus. Conventionally, there are known ink-jet recording apparatuses including a recording head. Conventional ink-jet recording apparatuses convey a recording medium using a conveying belt and eject ink from the recording head toward the recording medium being conveyed by the conveying belt to form an image on the recording medium.

SUMMARY

According to one aspect of the present disclosure, an ink-jet recording apparatus includes a conveying belt, a recording head, and a control portion. The conveying belt is supported so as to be able to move around and conveys a recording medium by circulating. The recording head is arranged opposite the recording medium, and has a plurality of nozzles that are arrayed in the width direction perpendicular to the circulation direction of the conveying belt. The recording head prints on the recording medium by ejecting ink from the nozzles. The control portion controls flushing processing by the recording head. The conveying belt has a plurality of flushing areas with openings formed in it. The flushing areas are arranged at predetermined intervals from each other in the circulation direction. When successive printing is performed on a plurality of recording media of the same size that are conveyed sequentially by the conveying belt, the control portion sets, as a control period for flushing processing, the period after the arrival, at a position opposite the recording head, of the recording medium to be printed first in successive printing until the passage, at the position opposite the recording head, of the recording medium to be printed last in successive printing. When, during the control period, a flushing area that does not overlap the recording medium faces the recording head, the control portion makes the recording head eject ink, as flushing processing, from all the nozzles toward the openings. The control portion sets, of the plurality of nozzles, the nozzles that do not face the recording medium during the control period as first nozzles, and the nozzles that face the recording medium during the control period as second nozzles. The control portion controls in such a way as to make the total amount of ink ejected by each of the first nozzles in flushing processing during the control period smaller than the total amount of ink ejected by each of the second nozzles.

DETAILED DESCRIPTION

As an example of an inkjet recording apparatus according to an embodiment, a printer will be taken in the following description. For example, a printer prints an image on a sheet as a recording medium. Any of various types of sheets such as an OHP sheet can be used as a recording medium.

<The Overall Structure of a Printer>

Figure 1:
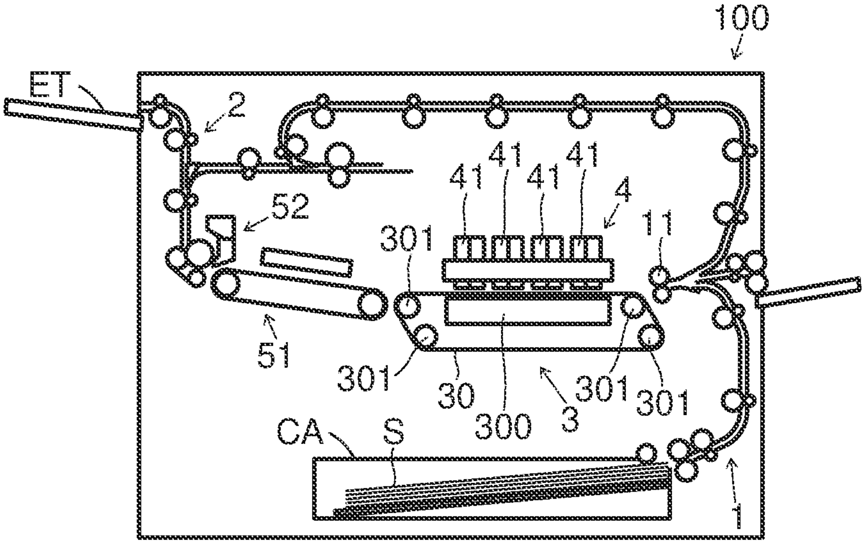
FIG. 1 is a schematic diagram of an ink-jet recording apparatus according to one embodiment.

As shown in FIG. 1, a printer 100 according to the embodiment includes a first conveying portion 1 and a second conveying portion 2. The first conveying portion 1 feeds out a sheet S set in a sheet feeding cassette CA to convey it to a printing position. In a print job by the printer 10, printing is performed on the sheet S passing across the printing position. The second conveying portion 2 conveys the printed sheet S and discharges it onto a discharge tray ET.

Although not illustrated, for example, a plurality of sheet feeding cassettes CA are mounted in the printer 100. The sheets S set in the plurality of sheet feeding cassettes CA may be in the same size or in different sizes. In a print job by the printer 100, of the plurality of sheet feeding cassettes CA, the one in which the sheet S to be used in the print job is set as a sheet supply source, and the sheet S is fed from the sheet feeding cassette CA that is set as the sheet supply source.

The first conveying portion 1 includes a plurality of conveying roller members including a pair of registration rollers 11. The plurality of conveying roller members rotate to convey the sheet S. The pair of registration rollers 11 is configured as a pair of rollers that are kept in pressed contact with each other. A registration nip is formed between the pair of rollers. The sheet S fed from the sheet feeding cassette CA passes through the registration nip. The pair of registration rollers 11 rotates to convey the sheet S that passes through the registration nip toward a belt conveying portion 3, which will be described later.

The pair of registration rollers 11 is not rotating when the front end of the sheet S reaches the registration nip. At this point, the conveying roller members on the upstream side of the pair of registration rollers 11 in the sheet conveying direction are rotating. This helps correct a skew of the sheet S.

The printer 100 includes the belt conveying portion 3. The belt conveying portion 3 receives the sheet S from the first conveying portion 1 and conveys it. The belt conveying portion 3 includes a conveying belt 30. The conveying belt 30 is endless and is supported so as to be able to move around. The belt conveying portion 3 includes a plurality of stretching rollers 301. The plurality of stretching rollers 301 are rotatably supported. The conveying belt 30 is stretched around the plurality of stretching rollers 301 and moves around.

One of the plurality of stretching rollers 301 is coupled to a belt motor (not shown) and rotates by receiving a driving force from the belt motor. When the stretching roller 301 coupled to the belt motor rotates, the conveying belt 30 moves around and the other stretching rollers 301 rotate by following it.

The belt conveying portion 3 includes a suction unit 300. The suction unit 300 is arranged at the inner side of the conveying belt 30. In the conveying belt 30, a plurality of suction holes (not shown) that penetrate it in its thickness direction are formed.

The sheet S conveyed from the first conveying portion 1 reaches the outer circumferential face of the conveying belt 30. The suction unit 300 sucks the sheet S through the suction holes. The sheet S on the outer circumferential face of the conveying belt 30 is held by suction on the outer circumferential face of the conveying belt 30. The conveying belt 30 moves around with the sheet S held by suction on its outer circumferential face. The sheet S is thus conveyed.

In this way, the belt conveying portion 3 conveys the sheet S in the circulation direction of the conveying belt 30. That is, the circulation direction of the conveying belt 30 coincides with the conveying direction of the sheet S (the direction in which the sheet S advances).

The printer 100 includes a recording portion 4. The recording portion 4 is arranged opposite the outer circumferential face of the conveying belt 30. When the sheet S is held by suction on the outer circumferential face of the conveying belt 30, the sheet S and the recording portion 4 face each other across a gap left between them.

Figure 2:
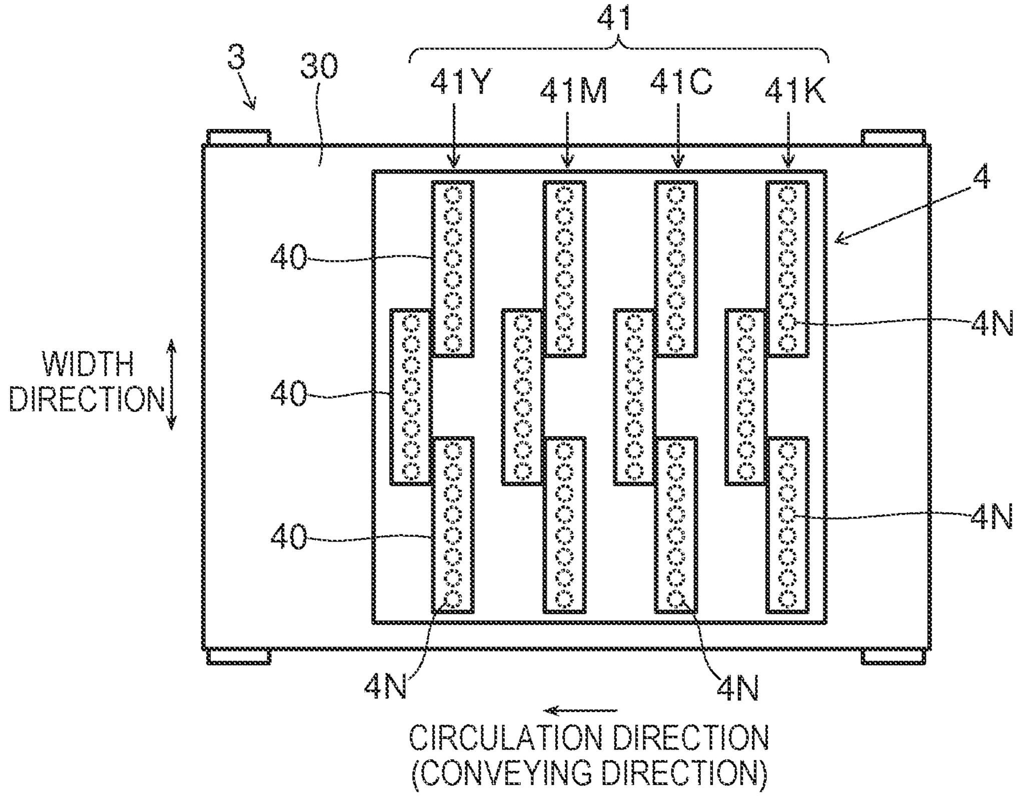
FIG. 2 is a plan view of a recording portion in the ink-jet recording apparatus according to the one embodiment.

As shown in FIG. 2, the recording portion 4 includes four line heads 41 corresponding to different colors, namely cyan, magenta, yellow, and black. In FIG. 2, the line heads 41 for cyan, magenta, yellow, and black are identified by the suffixes "C", "M". "Y", and "K" respectively.

The line heads 41 for the different colors each include a plurality of (for example, three) recording heads 40. For example, the plurality of recording heads 40 for each color are arranged in a staggered formation in the direction perpendicular to the circulation direction of the conveying belt 30 (the conveying direction of the sheet S). In the following description, the direction perpendicular to the circulation direction of the conveying belt 30 is referred to simply as the "width direction".

The recording heads 40 are arranged opposite the outer circumferential face of the conveying belt 30 in the up-down direction across a gap left between them. In other words, the recording heads 40 are arranged at such a position as to face, in the up-down direction, the sheet S being conveyed by the conveying belt 30. Here, the up-down direction is the direction perpendicular to the circulation direction of the conveying belt 30 and also to the width direction.

The recording heads 40 each have a nozzle face that faces the conveying belt 30 (the sheet S on the conveying belt 30). The nozzle faces of the recording heads 40 have a plurality of nozzles 4N. The plurality of nozzles 4N in the recording heads 40 eject ink of different colors corresponding to the recording heads 40. For example, the recording heads 40 all have the same number of nozzles 4N. The plurality of nozzles 4N in the recording heads 40 are arranged along the width direction of the conveying belt 30. In FIG. 2, the nozzles 4N are indicated by broken lines. In reality, the recording heads 40 have a larger number of nozzles 4N.

The recording portion 4 (recording heads 40), based on image data to be printed in a print job, ejects ink from the nozzles 4N toward the sheet S. The ink ejected from the recording portion 4 attaches to the sheet S. An image is thus printed on the sheet S. That is, the position between the conveying belt 30 and the recording heads 40 is the printing position. In other words, the position that faces the nozzle faces (nozzles 4N) of the recording heads 40 in the up-down direction is the printing position.

Here, out of the plurality of nozzles 4N, in the nozzles 4N which eject ink less often, the viscosity of ink increases over time. This results in nozzle clogging and degraded image quality. To suppress such inconveniences, the recording heads 40 perform flushing processing. In flushing processing by the recording heads 40, ink stagnant in the nozzles 4N is discharged. Nozzle clogging is thus suppressed. This will be described in detail later.

Back in FIG. 1, the printer 100 includes a drying unit 51 and a decurler 52. The drying unit 51 dries the ink attached to the sheet S being conveyed while conveying the sheet S toward the decurler 52. The decurler 52 corrects the curl of the sheet S. The decurler 52 conveys the decurled sheet S toward the second conveying portion 2.

Figure 3:
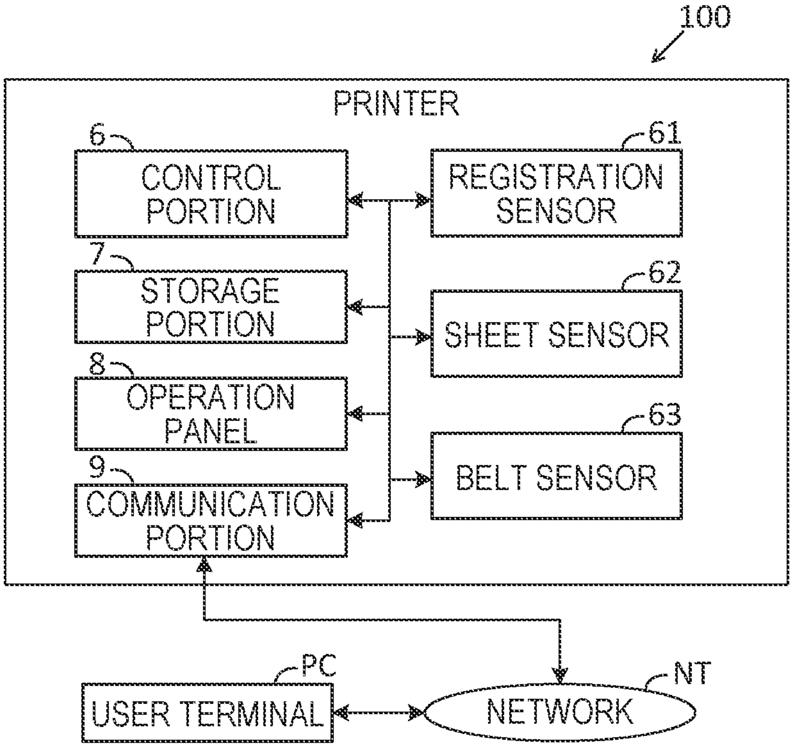
FIG. 3 is a block diagram of the ink-jet recording apparatus according to the one embodiment.

As shown in FIG. 3, the printer 100 includes a control portion 6. The control portion 6 includes a processing circuit such as a CPU and an ASIC. The control portion 6 controls the print job performed on the printer 100. In other words, the control portion 6 controls the operation of the first and second conveying portions 1 and 2, the belt conveying portion 3, the recording portion 4, the drying unit 51, and the decurler 52. In yet other words, the control portion 6 controls the conveyance of the sheet S and the ejection of ink by the recording heads 40. The control portion 6 also controls flushing processing by the recording heads 40.

Figure 4:
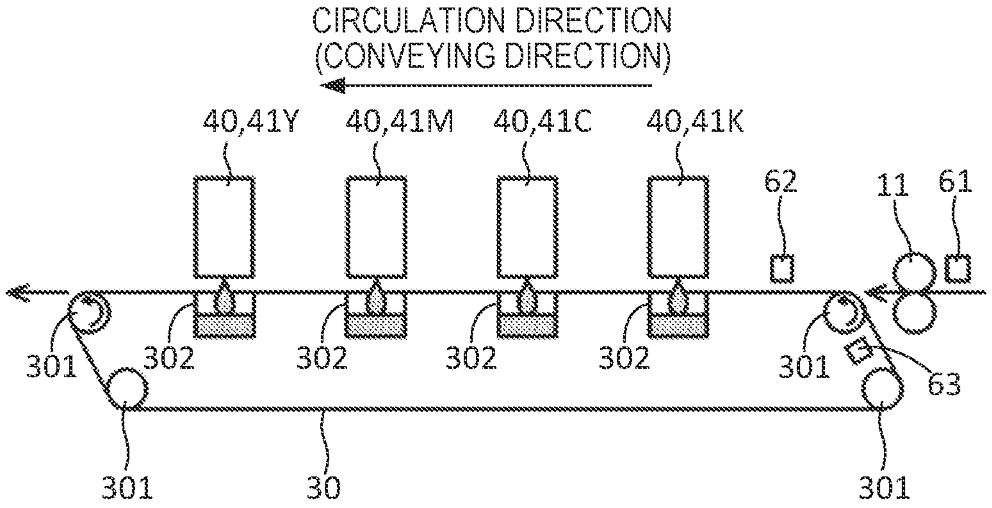
FIG. 4 is a schematic diagram of and around a conveying belt in the ink-jet recording apparatus according to the one embodiment.

To the control portion 6, a registration sensor 61, a sheet sensor 62, and a belt sensor 63 are connected. The sensing positions (arranged positions) of the registration sensor 61, the sheet sensor 62, and the belt sensor 63 are schematically shown in FIG. 4.

The sensing position of the registration sensor 61 is a position on the upstream side of the registration nip in the sheet conveying direction. The registration sensor 61 is, for example, an optical sensor of a reflective or transmissive type. The registration sensor 61 changes its output value according to whether or not the sheet S is present at the corresponding sensing position.

Based on the output value of the registration sensor 61, the control portion 6 senses arrival of the leading edge, and passage of the trailing edge, of the sheet S at the sensing position of the registration sensor 61. In other words, based on the output value of the registration sensor 61, the control portion 6 senses arrival of the leading edge, and passage of the trailing edge, of the sheet S at the registration nip. Based on the elapsed time since the arrival of the leading edge of the sheet S at the sensing position of the registration sensor 61, the control portion 6 adjusts the timing at which the pair of registration rollers 11 starts conveying the sheet S (the timing at which the pair of registration rollers 11 starts rotating). Even if the sheet S is skewed, its conveyance by the pair of registration rollers 11 is started with the skew corrected.

The sensing position of the sheet sensor 62 is a position between the registration nip and the printing position of, of the plurality of line heads 41, the line head 41 at the most upstream side in the sheet conveying direction. The sheet sensor 62 changes its output value according to whether or not the sheet S is present at the corresponding sensing position. As the sheet sensor 62, a CIS (contact image sensor) or an optical sensor of a reflective or transmissive type may be used. For example, a CIS is used as the sheet sensor 62.

Based on the output value of the sheet sensor 62, the control portion 6 senses arrival of the leading edge, and passage of the trailing edge, of the sheet S at the sensing position of the sheet sensor 62. Based on the output value of the sheet sensor 62, the control portion 6 adjusts the timing at which to eject ink to the sheet S conveyed by the conveying belt 30. The control portion 6 may instead adjust the timing at which to eject ink to the sheet S conveyed by the conveying belt 30 based on the elapsed time since the start of the conveyance of the sheet S by the pair of registration rollers 11.

The control portion 6 measures the sheet passage time after the arrival of the leading edge of the sheet S at the sensing position of the sheet sensor 62 until the passage of the trailing edge of the sheet S at the sensing position of the sheet sensor 62. The sheet passage time at the sensing position of the sheet sensor 62 changes depending on the size of the sheet S in the conveying direction. Thus, the control portion 6, based on the sheet passage time, recognizes the size, in the conveying direction, of the sheet S conveyed by the conveying belt 30. In this way, even if the sheet S conveyed by the conveying belt 30 is of an irregular size, it is possible to make the control portion 6 recognize the size of the sheet S in the conveying direction.

Furthermore, the control portion 6 senses the deviation (skew) of the sheet S based on the output value of the sheet sensor 62 (read data obtained through reading by the sheet sensor 62). For example, after the conveyance of the sheet S by the pair of registration rollers 11 is started, the sheet S may deviate. In this case, the deviation of the sheet S is sensed by the control portion 6.

It is also possible to provide a plurality of sheet sensors 62. For example, two sheet sensors 62 may be provided.

The belt sensor 63 is a sensor for sensing a prescribed reference position (home position) of the conveying belt 30. The reference position of the conveying belt 30 is indicated by a predetermined mark. This allows the reference position of the conveying belt 30 to be sensed based on the output value of the belt sensor 63. For example, a CIS is used as the belt sensor 63. The belt sensor 63 may be configured using an optical sensor of a transmissive or reflective type.

The control portion 6 senses the reference position of the conveying belt 30 based on the output value of the belt sensor 63. In other words, the control portion 6 senses the position of a flushing area 31 (openings 310), which will be described later, in the circulation direction based on the output value of the belt sensor 63.

As shown in FIG. 3, the printer 100 includes a storage portion 7. The storage portion 7 includes storage devices such as a ROM, a RAM, an HDD, and an SSD. The storage portion 7 is connected to the control portion 6. The control portion 6 reads information from the storage portion 7. The control portion 6 writes information to the storage portion 7.

The printer 100 includes an operation panel 8. The operation panel 8 includes, for example, a touch screen. The touch screen displays software buttons, messages, etc., and accepts touch operations by a user. The operation panel 8 also includes hardware buttons for accepting settings, instructions, etc. The operation panel 8 is connected to the control portion 6. The control portion 6 controls display operation on the operation panel 8 (touch screen). The control portion 6 senses operations performed on the operation panel 8.

The printer 100 includes a communication portion 9. The communication portion 9 includes a communication circuit, etc. The communication portion 9 is connected to a user terminal PC via a network NT. The user terminal PC is an information processing apparatus such as a personal computer. The control portion 6 communicates with the user terminal PC using the communication portion 9. For example, print data (data including PDL data, etc.) for a print job is transmitted to the printer 100 from the user terminal PC. In other words, a request to execute a print job is transmitted from the user terminal PC to the printer 100. Print data for a print job includes various types of setting data related to printing, such as the size of the sheet S to be used in the print job.

<Configuration of the Conveying Belt>

Figure 5:
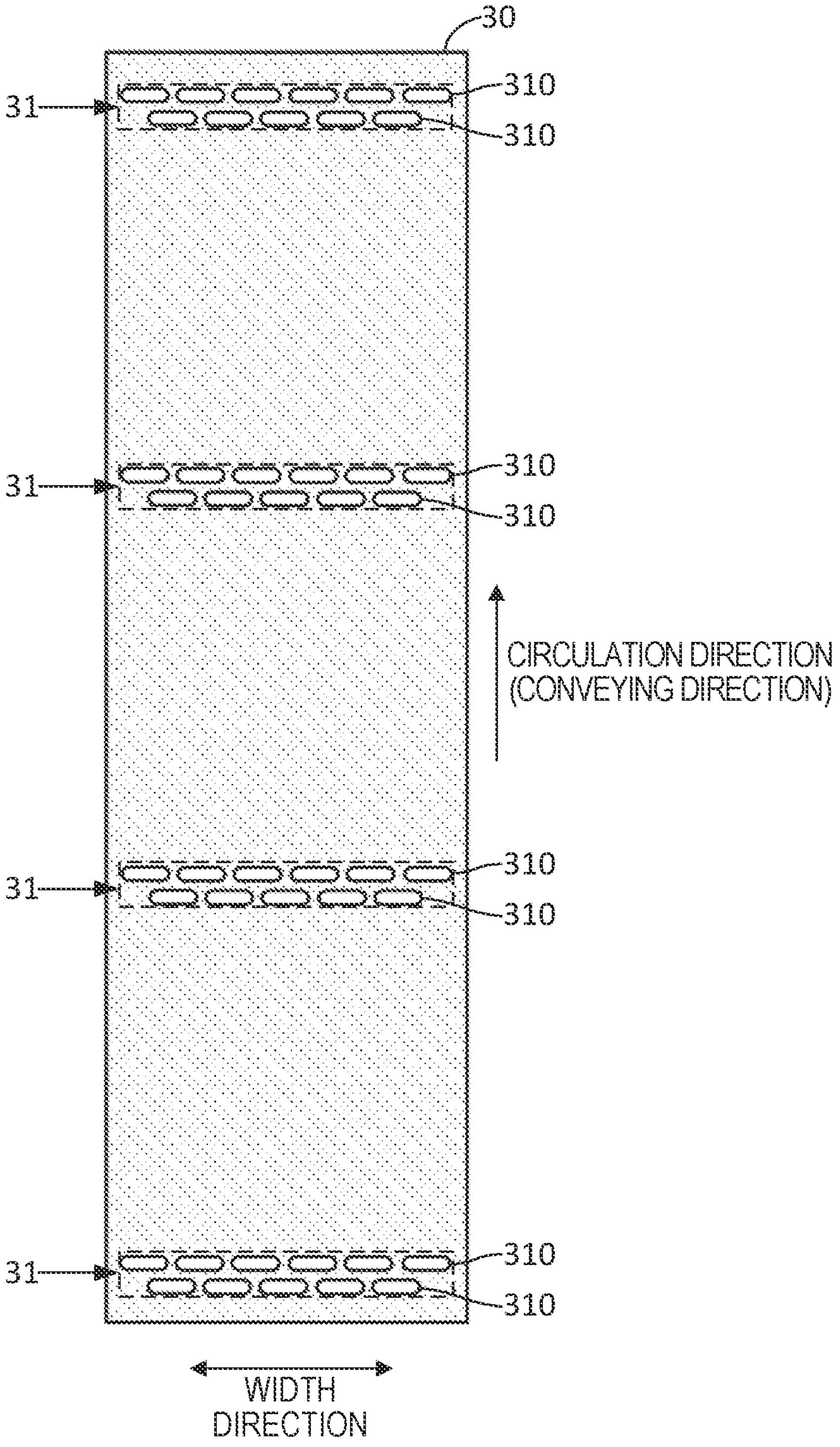
FIG. 5 is a plan view of the conveying belt in the ink-jet recording apparatus according to the one embodiment.

As shown in FIG. 5, the conveying belt 30 includes a flushing area 31. In FIG. 5, the flushing area 31 is enclosed by broken lines. The flushing area 31 is an area where openings 310 are formed that penetrate the conveying belt 30 in its thickness direction. In flushing processing, ink is ejected from the recording heads 40, and the ejected ink passes through the openings 310 to reach a receiving part 302 (see FIG. 4) arranged at the inner side of the conveying belt 30. The ink in the receiving part 302 is collected and discarded.

The conveying belt 30 has a plurality of flushing areas 31. The plurality of flushing areas 31 are arranged at predetermined intervals from each other in the circulation direction of the conveying belt 30.

Each flushing area 31 has a plurality of (the same number of) openings 310. The openings 310 are each an elongate hole extending in the width direction of the conveying belt 30. There is no particular limitation on the shape of the openings 310 (the shape as seen from the thickness direction of the conveying belt 30). It may be in a rectangular shape, circular shape, elliptical shape, or oval shape.

For example, each flushing area 31 includes two rows of openings. Each row of openings is a row of openings 310 that are arrayed at equal intervals in the width direction of the conveying belt 30. One row of openings has six openings 310, and the other row of openings has five openings 310. The middle of the rows of openings in the width direction coincides with the middle of the conveying belt 30 in the width direction. That is, the plurality of openings 310 in each flushing area 31 are arranged in a staggered formation in the width direction. Here, the length of the openings 310 in the width direction (i.e., opening width) is larger than the distance between two consecutive openings 310 in the width direction.

Figure 6:
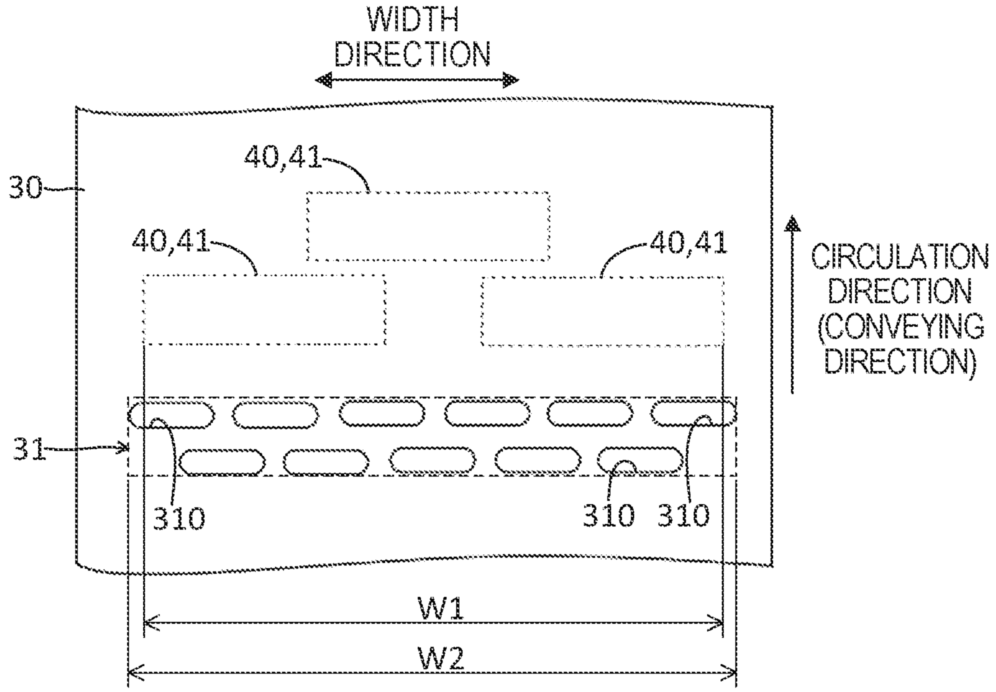
FIG. 6 is a diagram showing the positional relationship between a flushing area of the conveying belt and recording heads in the ink-jet recording apparatus according to the one embodiment.

As shown in FIG. 6, a width W1 (mm) is smaller than a width W2 (mm). The width W1 corresponds to the length of the line head 41 in the width direction. Specifically, the width W1 corresponds to the length in the width direction from an end, at one side, of the recording head 40 located at the one side in the width direction to an end, at the other side, of the recording head 40 located at the other side in the width direction. The width W2 corresponds to the length of the flushing area 31 in the width direction. Specifically, the width W2 corresponds to the length in the width direction from an end, at one side, of the opening 310 located farthest to the one side in the width direction to an end, at the other side, of the opening 310 located farthest to the other side in the width direction.

Thus, as the conveying belt 30 is circulated, it is possible to make each of the plurality of nozzles 4N in each recording head 40 face at least one of the openings 310 in the up-down direction. When, in flushing processing, ink that does not contribute to printing is ejected from the nozzles 4N, it is possible to control such that the ink passes through the openings 310 (such that the ink does not attach to the conveying belt 30 and to the sheet S).

<Conveyance of the Sheet>

In printing on a plurality of sheets S of the same size conveyed sequentially by the conveying belt 30, the control portion 6 controls such that the sheet-to-sheet distance, that is, the interval between the trailing edge of the foregoing sheet S and the leading edge of the subsequent sheet S (the sheet S conveyed after the foregoing sheet S) in the conveying direction (the dimension, in the conveying direction, of the region between the trailing edge of the foregoing sheet S and the leading edge of the subsequent sheet S) remains constant. That is, in this case, the control portion 6 controls such that a plurality of sheets S are conveyed at a constant interval (such that the sheet-to-sheet distance among the plurality of sheets S is constant). Successive printing on a plurality of sheets S of the same size conveyed sequentially at an interval by the conveying belt 30 corresponds to "successive printing", and will be hereinafter be referred to simply as "successive printing".

Here, during successive printing, flushing processing is performed in the recording heads 40. The control portion 6 controls the flushing processing by the recording heads 40. The ink ejected in flushing processing does not contribute to printing. Thus, the control portion 6 controls such that the ink ejected in flushing processing passes through the openings 310. That is, the control portion 6 makes the nozzles 4N eject ink at a timing at which they face the openings 310 that do not overlap the sheet S.

To perform such control, the control portion 6 checks the size of the sheet S conveyed by the conveying belt 30. The control portion 6 also senses the reference position of the conveying belt 30. Then, the control portion 6 adjusts the timing at which to start conveying the sheet S from the pair of registration rollers 11 to the conveying belt 30 so that the flushing areas 31 appear within the intervals of the sheets at a prescribed cycle. The control portion 6 changes the timing at which to start conveying the sheet S from the pair of registration rollers 11 to the conveying belt 30 according to the size of the sheet S conveyed by the conveying belt 30. Before performing a print job, the control portion 6 checks the size of the sheet S to be used in the print job (the sheet S to be conveyed by the conveying belt 30) based on print data for the print job to be performed.

Figure 7:
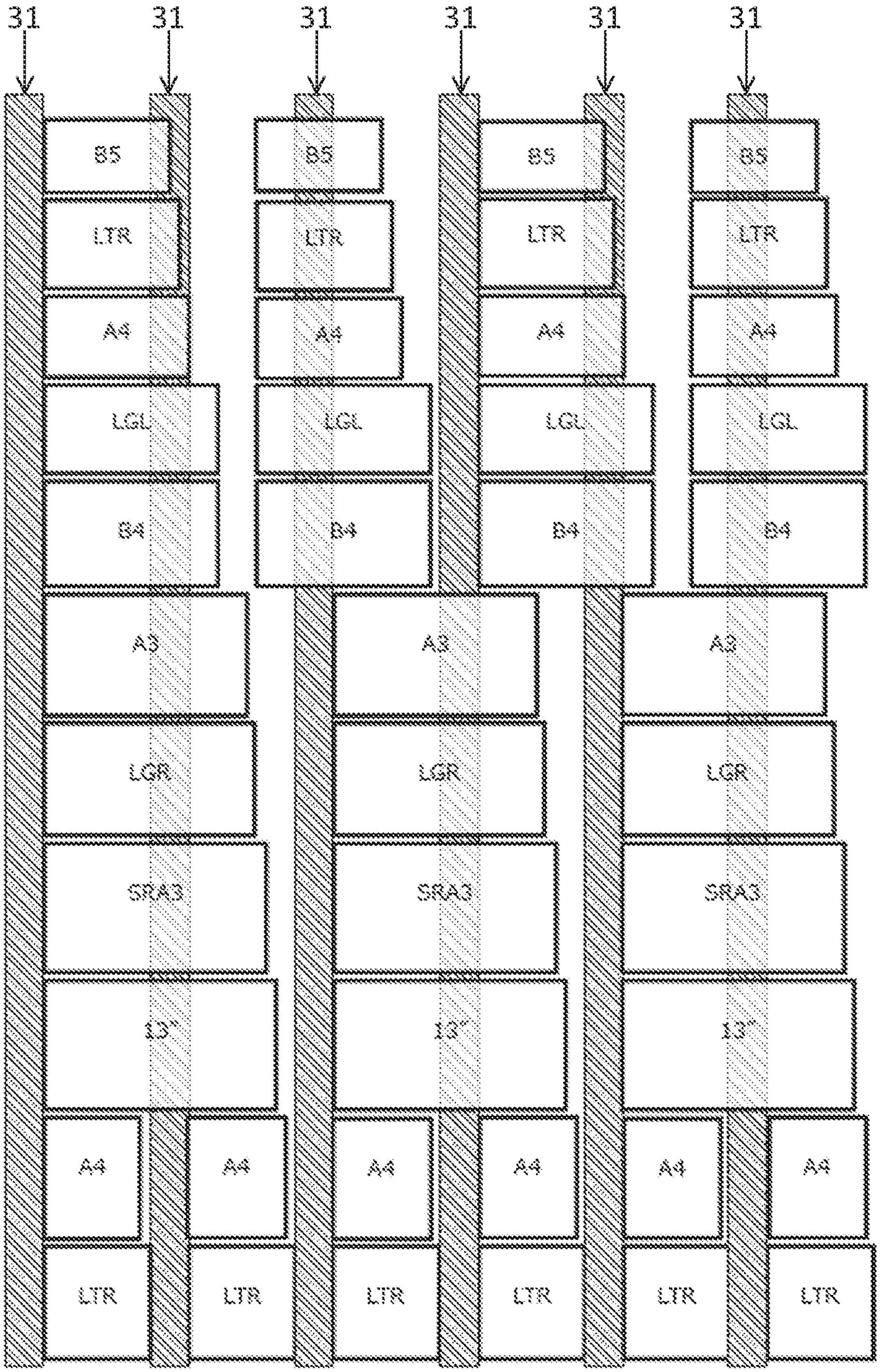
FIG. 7 is a diagram showing the positional relationship between the flushing areas of the conveying belt and sheets in the ink-jet recording apparatus according to the one embodiment.

The positional relationship between the sheets S conveyed by the conveying belt 30 and the flushing areas 31 is shown in FIG. 7. The circulation direction of the conveying belt 30 (the conveying direction of the sheet S) in FIG. 7 is the direction from right to left on the plane of FIG. 7. In FIG. 7, the flushing areas 31 are indicated by hatching, and the openings 310 are omitted. In FIG. 7, instead of the reference sign for the sheet S, the size of each sheet S is marked in the outline representing the sheet S. In FIG. 7, for the sake of convenience, a plurality of sheets S of different sizes are illustrated all together.

Figure 8:
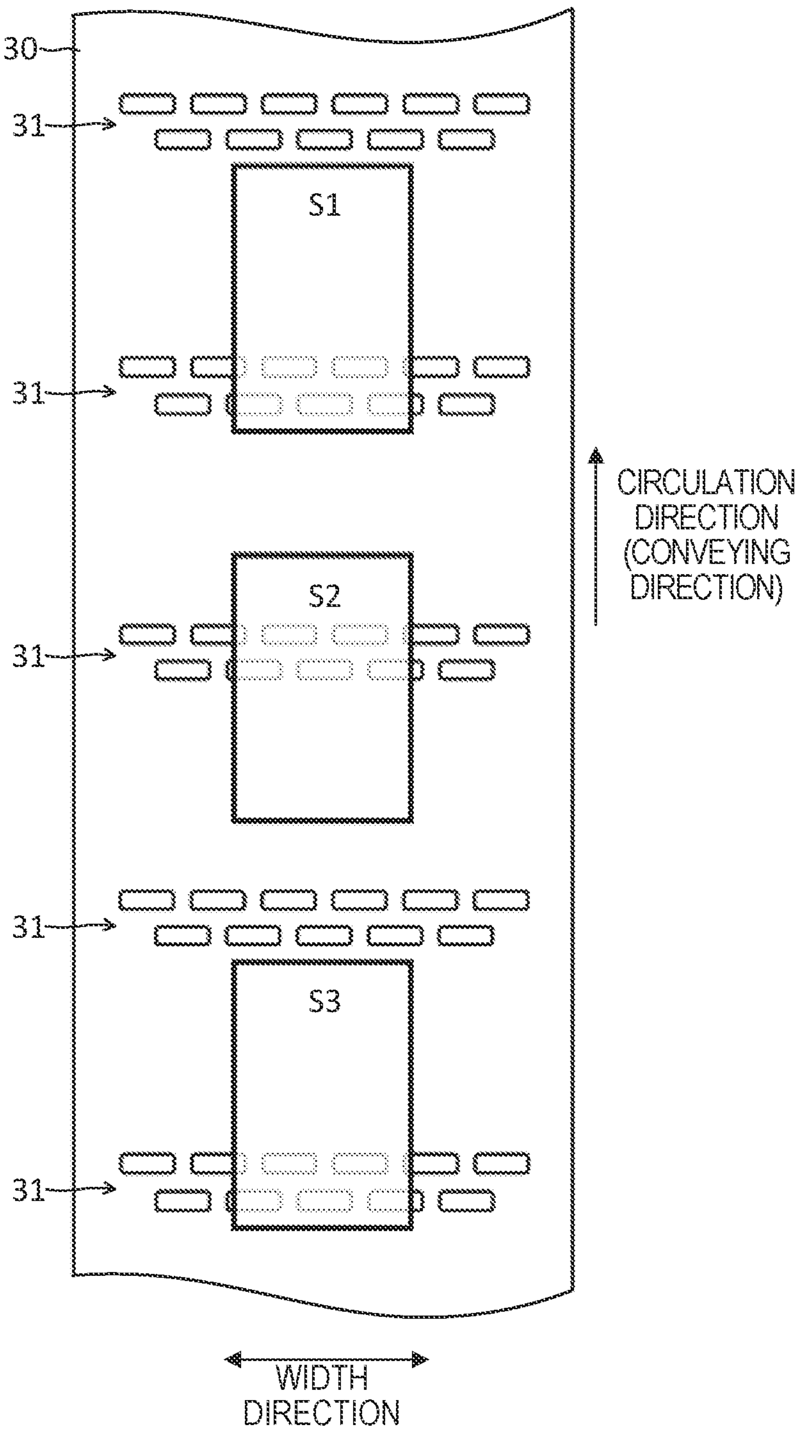
FIG. 8 is a diagram showing a state where sheets are being conveyed by the conveying belt in the ink-jet recording apparatus according to the one embodiment.

Now, with reference to FIG. 8, a detailed description will be given with focus on A4 portrait size. The circulation direction of the conveying belt 30 (the conveying direction of the sheet S) in FIG. 8 is the direction from bottom to top on the plane of FIG. 8. In FIG. 8, for the sake of convenience, three sheets S are shown, and they are identified by the suffixes 1 to 3 indicating the order of conveyance.

When the size of the sheet S is A4 portrait, no flushing area 31 appears between the first and second sheets S1 and S2. A flushing area 31 appears between the second and third sheets S2 and S3. The flushing area 31 between the sheets S2 and S3 does not overlap either the sheet S2 or S3 at all. Although not shown, no flushing area 31 appears between the third sheet S3 and the fourth sheet S. and a flushing area 31 appears between the fourth and fifth sheets S.

<Flushing Processing>

Hereinafter, how the flushing processing by each recording head 40 is controlled will be described with focus on one recording head 40. The other recording heads 40 are controlled similarly to the one recording head 40. Thus, for the control of the other recording heads 40, no overlapping description will be repeated.

The control portion 6 sets, as a control period for flushing processing in successive printing, the period after the arrival, at the printing position of the recording head 40 (the position opposite the recording head 40), of the leading edge of the sheet S to be printed first in successive printing on a plurality of sheets S of the same size until the passage, at the printing position of the recording head 40 (the position opposite the recording head 40), of the sheet S to be printed last in successive printing. The control portion 6 makes the recording head 40 perform flushing processing during the set control period.

Specifically, when, during the control period for flushing processing, a flushing area 31 that does not overlap the sheet S at all faces the recording head 40, the control portion 6 makes the recording head 40 eject ink, as flushing processing, from all the nozzles 4N in the recording head 40 toward the openings 310. Hereinafter, a flushing area 31 that does not overlap the sheet S is referred to as a non-overlapping flushing area 31 and is distinguished from other flushing areas 31.

In an example shown in FIG. 8, suppose that the first sheet in successive printing is the sheet S1, then the time point at which the leading edge of the sheet S1 arrives at the printing position of the recording head 40 is the start point of the control period. In the example shown in FIG. 8, when the non-overlapping flushing area 31 between the sheets S2 and S3 faces the recording head 40, flushing processing is performed. Although not illustrated, a non-overlapping flushing area 31 appears also between the fourth and fifth sheets S. and, w % ben the non-overlapping flushing area 31 faces the recording head 40, flushing processing is performed. From then on, non-overlapping flushing areas 31 appear between every two consecutive even- and odd-numbered sheets S, and, when a non-overlapping flushing areas 31 face the recording head 40, flushing processing is performed. That is, every time a non-overlapping flushing area 31 between sheets S conveyed by the conveying belt 30 reaches the position opposite the recording head 40, flushing processing is performed once.

Figure 9:
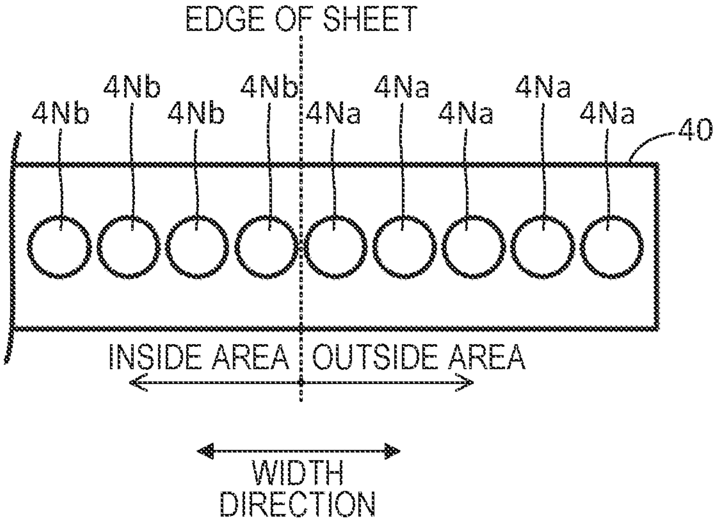
FIG. 9 is a diagram showing first nozzles and second nozzles in the ink-jet recording apparatus according to the one embodiment.

Here, as shown in FIG. 9, the control portion 6 sets, of the plurality of nozzles 4N in the recording head 40, the nozzles 4N that do not face the sheet S during the control period for flushing processing as first nozzles 4Na, and the nozzles 4N that face the sheet S during the control period for flushing processing as second nozzles 4Nb. Specifically, the plurality of nozzles 4N are classified into the nozzles 4N located outside, in the width direction, the range corresponding to the size of the sheet S in the width direction and the nozzles 4N located inside that range in the width direction. The former nozzles 4N are set as the first nozzles 4Na, and the latter nozzles 4N are set as the second nozzles 4Nb. The first nozzles 4Na are the ones that do not contribute to printing, and the second nozzles 4Nb are the ones that contribute to printing. In FIG. 9, the edge of the sheet S is indicated by a broken line.

In flushing processing during the control period for flushing processing, the control portion 6 controls in such a way as to make the total amount of ink ejected by each of the first nozzles 4Na smaller than the total amount of ink ejected by each of the second nozzles 4Nb. To perform such control, the control portion 6 makes each of the first nozzles 4Na eject a first amount of ink in one session of flushing processing, and makes each of the second nozzles 4Nb eject a second amount of ink in one session of flushing processing. The first amount is smaller than the second amount. That is, the second amount is larger than the first amount. The first and second amounts are prescribed by the manufacture of the printer 100.

For example, in flushing processing during the control period for flushing processing, the control portion 6 makes the total number of times of ink ejection by each of the first nozzles 4Na smaller than the total number of times of ink ejection by each of the second nozzles 4Nb. Thereby, in flushing processing during the control period for flushing processing, the control portion 6 makes the total amount of ink ejected by each of the first nozzles 4Na smaller than the total amount of ink ejected by each of the second nozzles 4Nb.

Here, when, during the control period for flushing processing, a flushing area 31 that partly overlaps the sheet S faces the recording head 40 (a flushing area 31 that only in a part of it overlaps the sheet S faces the recording head 40), the control portion 6 makes the recording head 40 further eject ink, as flushing processing, from the first nozzles 4Na toward the openings 310. Hereinafter, a flushing area 31 that partly overlaps the sheet S is referred to as a partly-overlapping flushing area 31 and is distinguished from other flushing areas 31.

The control portion 6 makes the recording head 40 perform flushing processing with the first nozzles 4Na every time a partly-overlapping flushing area 31 faces the recording head 40. Here, no flushing processing with the second nozzles 4Nb is performed.

In the example shown in FIG. 8, when a flushing area 31 that overlaps the sheet S1 faces the recording head 40, ink is ejected from the nozzles 4N (first nozzles 4Na) located outside the sheet S1 in the width direction toward the openings 310. When a flushing area 31 that overlaps the sheet S2 faces the recording head 40, ink is ejected from the nozzles 4N (first nozzles 4Na) located outside the sheet S2 in the width direction toward the openings 310. When a flushing area 31 that overlaps the sheet S3 faces the recording head 40, ink is ejected from the nozzles 4N (first nozzles 4Na) located outside the sheet S3 in the width direction toward the openings 310.

Figure 10:
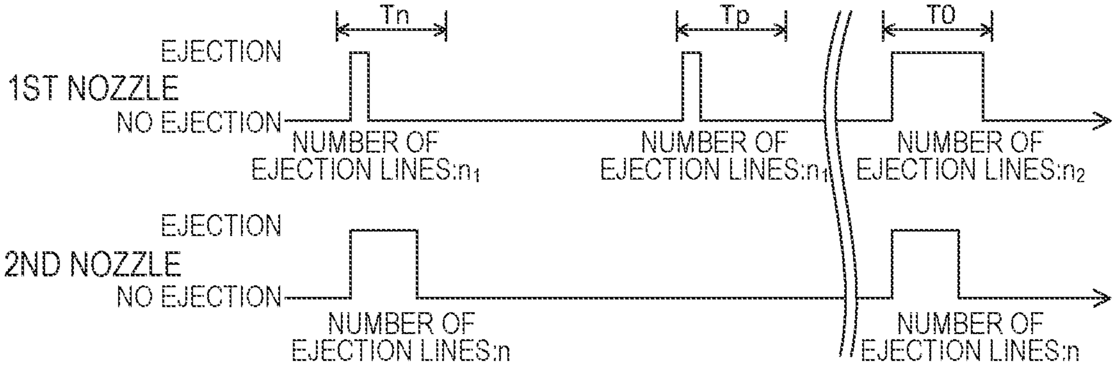
FIG. 10 is a diagram illustrating control of flushing processing performed in the ink-jet recording apparatus according to the one embodiment.

One example of control of flushing processing (including preparatory flushing processing, which will be described later) is shown in FIG. 10. As shown in FIG. 10, in a period Tn during which a non-overlapping flushing area 31 faces the recording head 40, the control portion 6 makes each of the first nozzles 4Na eject $n_1$ lines worth of ink (eject ink $n_1$ times), where $n_1$ is smaller than 10, and makes each of the second nozzles 4Nb eject n lines worth of ink (eject ink n times), where n is larger than 10 (for example, 30 lines). In addition, in a period Tp during which a partly-overlapping flushing area 31 faces the recording head 40, the control portion 6 makes each of the first nozzles 4Na eject $n_1$ lines worth of ink.

For example, in flushing processing, the amount of ink ejected by each of the nozzles 4N at one time is equal. In one session of flushing processing, by differentiating the numbers of times of ink ejection between the first and second nozzles 4Na and 4Nb, even if the amount of ink ejected by each of the first and second nozzles 4Na and 4Nb at one time is equal, it is possible to makes the amount of ink ejected by the first nozzles 4Na smaller than the amount of ink ejected by the second nozzles 4Nb.

Upon accepting a request for execution of a print job, the control portion 6 adds the accepted print job to a queue. When there are a plurality of printing jobs in the queue, the control portion 6 executes the plurality of printing jobs in the accepted order.

When the size of the sheet S to be used in a first print job of which the accepted order is Nth is the same as the size of the sheet S to be used in a second print job of which the accepted order is N+1, the control portion 6 executes the first and second jobs as a single job. In this case, the control portion 6 sets, as the control period for flushing processing, a period after the arrival of the first sheet S for the first print job at the printing position of the recording head 40 until the passage of the last sheet S for the second print job at the printing position of the recording head 40.

<Preparatory Flushing Processing>

Hereinafter, how preparatory flushing processing by the recording heads 40 is controlled will be described with focus on one recording head 40. The other recording heads 40 are controlled similarly to the one recording head 40. Thus, for the control of the other recording heads 40, no overlapping description will be repeated.

When the size of a preceding sheet S (corresponding to a "preceding recording medium") which is the sheet S conveyed first by the conveying belt 30 to be printed is different from the size of a succeeding sheet S (corresponding to a "succeeding recording medium") which is the sheet S conveyed after the first sheet S to be printed, the control portion 6 performs switching processing to switch sheet supply sources. Thus, the sheet-to-sheet distance between the preceding sheet S and the succeeding sheet S increases. As a result, the viscosity of the ink in the nozzles 4N increases before the succeeding sheet S is printed, and this may cause nozzle clogging.

For example, the size of the sheet S used in the first print job of which the accepted order is Nth can be different from the size of the sheet S used in the second print job of which the accepted order is (N+1)th. In this case, the control portion 6, after performing sheet feeding of the last sheet S for the first print job (preceding sheet S), performs switching processing, and then starts performing sheet feeding of the first sheet S for the second print job (succeeding sheet S). Thus, the sheet-to-sheet distance between the preceding sheet S and the succeeding sheet S increases.

Here, when the size, in the width direction, of the succeeding sheet S is larger than that of the preceding sheet S, in the printing on the succeeding sheet S, the nozzles 4N that were not used in the printing on the preceding sheet S are used. In the nozzles 4N that have left unused long, the viscosity of ink tends to increase. Accordingly, it is preferable to perform, before printing on the succeeding sheet S, processing for forcibly ejecting the ink in the nozzles 4N that were not used in the printing on the preceding sheet S (that is, flushing processing).

Thus, when the size of the succeeding sheet S in the width direction is larger than the size of the preceding sheet S in the width direction, the control portion 6, after the passage of the preceding sheet S at the printing position of the recording head 40 (the position opposite the recording head 40) before the arrival of the succeeding sheet S at the printing position of the recording head 40 (the position opposite the recording head 40), makes the recording head 40 perform preparatory flushing processing in which a predetermined amount of ink larger than the first amount is ejected toward the openings 310 from each of the nozzles 4N that have been set as the first nozzles 4Na during printing on the preceding sheet S.

For example, when a flushing area 31 that is closest to the succeeding sheet S on the downstream side of the succeeding sheet S in the conveying direction faces the recording head 40, the control portion 6 makes the recording head 40 perform preparatory flushing processing. Hereinafter, a flushing area 31 that is closest to the succeeding sheet S on the downstream side of the succeeding sheet S in the conveying direction is referred to as a preparatory flushing area 31 and is distinguished from other flushing areas 31. Here, a preparatory flushing area 31 is a flushing area that does not overlap the sheet S at all.

In the example shown in FIG. 8, suppose that the succeeding sheet S is the sheet S1. In this case, the flushing area 31 shown just above the sheet S1 is a preparatory flushing area 31. Although not illustrated, a flushing area 31 on the downstream side, in the sheet conveying direction, of the flushing area 31 just above the sheet S1 in FIG. 8 may be set as a preparatory flushing area 31.

When a preparatory flushing area 31 faces the recording head 40, the control portion 6 makes the recording head 40 perform, as preparatory flushing processing, processing in which a predetermined amount of ink that is larger than the first amount is ejected from each of the nozzles 4N that have been set as the first nozzles 4Na during printing on the preceding sheet S toward the openings 310 in the preparatory flushing area 31. Here, the predetermined amount is larger than the second amount. The control portion 6 makes the recording head 40 further perform, as preparatory flushing processing, processing in which ink is ejected toward the openings 310 from each of the nozzles 4N that have been set as the second nozzles 4Nb during printing on the preceding sheet S. For example, when preparatory flushing processing is performed, the recording head 40 makes each of the nozzles 4N that have been set as the second nozzles 4Nb during printing on the preceding sheet S eject an amount of ink larger than the second amount (for example, of the same amount as the second amount).

For example, as shown in FIG. 10, in a period TO during which a preparatory flushing area 31 faces the recording head 40, the control portion 6 makes each of the nozzles 4N that have been set as the first nozzles 4Na during printing on the preceding sheet S eject $n_2$ lines worth of ink (eject ink $n_2$ times), where $n_2$ is larger than the number of ink ejection lines in ordinary flushing processing with the second nozzles 4Nb. Also in a period TO during which a preparatory flushing area 31 faces the recording head 40, the control portion 6 makes the nozzles 4N that have been set as the second nozzles 4Nb during printing on the preceding sheet S eject the same n lines (30 lines) worth of ink as in ordinary flushing processing with the second nozzles 4Nb. An amount of ink larger than n lines worth of ink may be ejected from the nozzles 4N that have been set as the second nozzles 4Nb during printing on the preceding sheet S.

In this embodiment, as described above, the control portion 6 sets, of the plurality of nozzles 4N, the nozzles 4N that do not face the sheet S during the control period for flushing processing as the first nozzles 4Na, and the nozzles 4N that face the sheet S during the control period for flushing processing as the second nozzles 4Nb. Here, the second nozzles 4Nb contribute to printing, and the first nozzles 4Na do not contribute to printing. Thus, even if an ink ejection failure due to clogging of the first nozzles 4Na occurs during successive printing, it does not cause image quality degradation. In other words, reducing the amount of ink ejected by the first nozzles 4Na in flushing processing has little effect on image quality. In yet other words, by sufficiently performing flushing processing with the second nozzles 4Nb, it is possible to suppress degradation of image quality during successive printing.

Thus, in this embodiment, as described above, the control portion 6 controls, in flushing processing during the control period for flushing processing, in such a way as to make the total amount of ink ejected by each of the first nozzles 4Na smaller than the total amount of ink ejected by each of the second nozzles 4Nb. In this way, it is possible to reduce the amount of ink consumed in flushing processing while suppressing degradation of image quality.

In conventional flushing processing, for example, the same amount of ink is ejected from each of the nozzles. That is, from the nozzles that do not contribute to printing, the same amount of ink as that from the nozzles that contribute to printing is ejected in flushing processing. Thus, with conventional control, inconveniently, the amount of ink consumed in flushing processing increases.

In this embodiment, as described above, when, during the control period for flushing processing, a flushing area 31 that partly overlaps the sheet S faces the recording head 40, the control portion 6 makes the recording head 40 further eject ink, as flushing processing, from the first nozzles 4Na toward the openings 310. With this configuration, the number of sessions of flushing processing performed with the first nozzles 4Na increases compared to a case where flushing processing with the first nozzles 4Na is performed only when a non-overlapping flushing area 31 faces the recording head 40. Thus, it is possible to suppress clogging of the first nozzles 4Na. Thus, when the nozzles 4N that have been set as the first nozzles 4Na in the present printing contribute to the subsequent printing, it is possible to suppress degradation of image quality in the subsequent printing.

In this embodiment, as described above, the control portion 6 makes, during the control period for flushing processing, the total number of times of ink ejection (the number of ink ejection lines) by the first nozzles 4Na in flushing processing smaller than the total number of times of ink ejection (the number of ink ejection lines) by each of the second nozzles 4Nb. Thereby, during the control period for flushing processing, it is possible to make the total amount of ink ejected by each of the first nozzles 4Na smaller than the total amount of ink ejected by each of the second nozzles 4Nb easily.

In this embodiment, when the size, in the width direction, of the succeeding sheet S to be conveyed after the preceding sheet S is larger than the size of the preceding sheet S in the width direction, the control portion 6, after the passage of the preceding sheet S at the position opposite the recording head 40 before the arrival of the succeeding sheet S at the position opposite the recording head 40, makes the recording head 40 perform preparatory flushing processing in which a predetermined amount of ink larger than the first amount is ejected toward the openings 310 from each of the nozzles 4N that have been set as the first nozzles 4Na during printing on the preceding sheet S. With this configuration, it is possible to suppress degradation of image quality in printing on the succeeding sheet S.

In this embodiment, as described above, the predetermined amount is larger than the second amount. Thus, it is possible to suppress clogging of the nozzles 4N that have been set as the first nozzles 4Na during printing on the preceding sheet S.

In this embodiment, as described above, the control portion 6 makes the recording head 40 further perform, as preparatory flushing processing, processing in which ink is ejected toward the openings 310 from each of the nozzles 4N that have been set as the second nozzles 4Nb during printing on the preceding sheet S. Thus, it is possible to suppress clogging of the nozzles 4N that have been set as the second nozzles 4Nb during printing on the preceding sheet S.

The embodiments disclosed herein should be understood to be in every aspect illustrative and not restrictive. The scope of the present disclosure is not limited by the description of the embodiments given above but by the appended claims, and encompasses any modifications made within a sense and scope equivalent to those of the claims.

What is claimed is:

1. An ink-jet recording apparatus comprising:

a conveying belt that is supported so as to be able to move around, the conveying belt conveying a recording medium by circulating;

a recording head that is arranged opposite the recording medium, the recording head having a plurality of nozzles that are arrayed in a width direction perpendicular to a circulation direction of the conveying belt, the recording head printing on the recording medium by ejecting ink from the nozzles; and a control portion that controls flushing processing by the recording head, wherein the conveying belt has a plurality of flushing areas with openings formed therein, the flushing areas are arranged at predetermined intervals from each other in the circulation direction, when successive printing is performed on a plurality of recording media of a same size that are conveyed sequentially by the conveying belt, the control portion sets, as a control period for the flushing processing, a period after arrival, at a position opposite the recording head, of the recording medium to be printed first in the successive printing until passage, at the position opposite the recording head, of the recording medium to be printed last in the successive printing, when, during the control period, the flushing area that does not overlap the recording medium faces the recording head, the control portion makes the recording head eject ink, as the flushing processing, from all the nozzles toward the openings, and the control portion sets, of the plurality of nozzles, the nozzles that do not face the recording medium during the control period as first nozzles, and the nozzles that face the recording medium during the control period as second nozzles and controls in such a way as to make a total amount of ink ejected by each of the first nozzles in the flushing processing during the control period smaller than a total amount of ink ejected by each of the second nozzles.

2. The ink-jet recording apparatus according to claim 1, wherein when, during the control period, the flushing area that partly overlaps the recording medium faces the recording head, the control portion makes the recording head further eject ink, as the flushing processing, from the first nozzles toward the openings.

3. The ink-jet recording apparatus according to claim 1, wherein by making a total number of times of ink ejection by each of the first nozzles smaller than a total number of times of ink ejection by each of the second nozzles in the flushing processing during the control period, the control portion makes the total amount of ink ejected by each of the first nozzles in the flushing processing during the control period smaller than the total amount of ink ejected by each of the second nozzles.

4. The ink-jet recording apparatus according to claim 1, wherein the amount of ink ejected by the first nozzles in the flushing processing is set at a first amount, and when a size, in the width direction, of a succeeding recording medium to be conveyed after a preceding recording medium is larger than a size, in the width direction, of the preceding recording medium conveyed first by the conveying belt, the control portion, after passage of the preceding recording medium at the position opposite the recording head before arrival of the succeeding recording medium at the position opposite the recording head, makes the recording head perform preparatory flushing processing in which a predetermined amount of ink larger than the first amount is ejected toward the openings from the nozzles that have been set as the first nozzles during printing on the preceding recording medium.

5. The ink-jet recording apparatus according to claim 4, wherein the amount of ink ejected by the second nozzles in flushing processing is set at a second amount larger than the first amount, and the predetermined amount is larger than the second amount.

6. The ink-jet recording apparatus according to claim 5, wherein the control portion makes the recording head further perform, as the preparatory flushing processing, processing in which ink is ejected toward the openings from the nozzles that have been set as the second nozzles during printing on the preceding recording medium.

* * * * *